United States Patent [19]

Konigsbacher

[11] 4,163,676

[45] Aug. 7, 1979

[54] ETHANOL-MODIFIED LECITHIN COOKWARE SPRAY COMPOSITION

[75] Inventor: Kurt S. Konigsbacher, Stamford, Conn.

[73] Assignee: Blue Cross Laboratories, N. Hollywood, Calif.

[21] Appl. No.: 892,488

[22] Filed: Apr. 3, 1978

[51] Int. Cl.² ............................................. C08L 91/00
[52] U.S. Cl. .................................. 106/243; 106/244; 426/609
[58] Field of Search .................. 106/243, 244, 287.24; 426/609

[56] References Cited

U.S. PATENT DOCUMENTS

| | | | |
|---|---|---|---|
| 2,559,481 | 7/1951 | Truesdell | 426/609 |
| 2,963,372 | 12/1960 | Brody | 426/609 |
| 3,928,056 | 12/1975 | Szuhaj | 106/243 |
| 4,073,411 | 2/1978 | Doumani | 106/244 |

OTHER PUBLICATIONS

Chem. Abst, 46:9871, 1952.

*Primary Examiner*—Theodore Morris
*Attorney, Agent, or Firm*—Louis J. Bachand

[57] ABSTRACT

A pump dispensable lecithin-based pan spray composition comprising lecithin in an essentially anhydrous vehicle free of mineral oil and consisting essentially of a monohydric alcohol having 2 or 3 carbon atoms and vegetable oil in proportions providing pump sprayable consistency.

11 Claims, No Drawings

ETHANOL-MODIFIED LECITHIN COOKWARE SPRAY COMPOSITION

BACKGROUND OF THE INVENTION

This invention has to do with pan spray compositions and more particularly relates to lecithin-based pan spray compositions, specifically those which are sprayable from finger actuable pump bottles.

Lecithin has found substantial favor as a lubricant for cookware of all kinds. Users ranging from health faddists through busy housewives apply lecithin to cookware in advance of cooking, to lubricate the cooking surfaces and prevent food sticking.

Lecithin is a naturally occurring material of complex character and nearly intractable consistency. Early efforts at packaging lecithin to take advantage of the excellent natural lubricity involved dissolving the lecithin in a Freon or like normally gaseous propellant, under substantial pressures in conventional aerosol packages, see U.S. Pat. No. 3,796,363 to Lalone, U.S. Pat. No. 3,896,975 to Follmer, U.S. Pat. No. 4,073,411 to Doumani and U.S. Pat. No. 4,073,412 also to Doumani. See also U.S. Pat. No. 4,023,912 to Mahler et. al. for a lecithin cookware lubricant in a highly useful solid stick form.

Use of simple pump spray bottles for delivery of lecithin has been forestalled by the viscous nature of lecithin which makes finer pumping thereof arduous and ineffective, even when the lecithin is diluted with known diluents such as vegetable oils. Further, the difficultly delivered lecithin covers cookware erratically, too narrowly and/or with uneven depth and distribution.

SUMMARY OF THE INVENTION

It is therefore a primary objective of the present invention to provide a lecithin-based cookware lubricant composition which is pump-sprayable with minimum effort and which covers a suitably wide cookware area with uniformity of pattern and depth. It is another object of the invention to provide a lecithin-based cookware composition vehicle lending improvements to the consistency of the composition, easing delivery effort, and improving spray properties, which is stable, even through freeze-thaw cycling.

These and other objects to become apparent hereinafter are realized in accordance with the invention in a pump dispensable lecithin-based pan spray composition comprising 2.5 to 50, and up to 65 parts of lecithin, preferably 20 to 35 parts, and the balance thereof an essentially anhydrous vehicle free of mineral oil providing a pump sprayable consistency in the composition and consisting essentially of 2.5 to 25 parts, preferably 7.5 to 12.5 parts, of a monohydric alcohol having 2 to 3 carbon atoms, e.g. ethanol at 7.5 to 12.5 parts, and 10 to 85 parts of edible vegetable oil and preferably 35 to 75 parts, all per 100 parts by weight of the composition.

Water tends to aggravate consistency problems and is desirably minimized in the composition; maximum water content tolerable through manufacturing and handling is below that amount which forms a constant boiling mixture with the alcohol being used. More particularly, less than about 5% by weight water based on the alcohol, where ethanol is the alcohol used, and preferably not above 2%, (same basis), and less than about 2.5% water (again based on the alcohol) where isopropanol is the alcohol employed in the composition, should be used. Compositions free of water in amounts not below constant boiling mixtures with the alcohol used, are preferred.

The vegetable oil diluents employed are typically one or more of the glyceryl esters of straight chain fatty acids such as, and particularly, soybean oil, safflower oil, peanut oil, olive oil, corn oil, coconut oil, cottonseed oil, palm nut oil and apricot kernel oil.

PRIOR ART

In addition to the patents mentioned above, directed to lecithin cookware lubricants, other patents are available dealing with ethanol processing of lecithin, e.g. U.S. Pat. No. 1,150,691 to Martin teaches the extraction of lecithin from egg yoke with alcohol; U.S. Pat. No. 1,934,005 to Rewald teaches use of benzyl achohol for the purpose of forming stable, soap-free aqueous emulsions of lecithin; U.S. Pat. No. 2,402,690 to Stanley teaches forming lecithin containing imbibitions for margarines by the use of ethyl alcohol, glycerine or the like with or in place of water; U.S. Pat. No. 3,257,331 to Jameston teaches lecithin systems of improved water dispersability through the use of polyethoxylated intersterified triglyceride oil emulsifiers derived from polyhydric aliphatic alcohols; U.S. Pat. No. 3,069,361 to Cogswell also relates to improved dispersions of lecithin in water and suggests use of alkylated phenoxypolyether alcohols therefor; U.S. Pat. No. 2,287,838 to Stanley and U.S. Pat. No. 2,777,817 to Werly teach lecithin-based systems of specifically different composition.

None of the foregoing references teach, nor does the prior art of which applicant is aware, teach anhydrous vehicles for lecithin based alcohol, specifically ethanol or isopropanol, for the purpose of obtaining the benefits of lecithin lubrication on cookware with the utmost safety to the environment through the omission of propellants, at reduced cost to the consumer through simplified non-aerosol packaging, and with freeze-thaw stability in the package.

DETAILED DESCRIPTION OF THE PREFERRED EMBODIMENTS

Compositions of lecithin according to the invention are prepared by mixing together lecithin of an unusable consistency, with an essentially anhydrous vehicle comprising essentially ethanol (or isopropanol) and a vegetable oil diluent. Mixing procedures are not narrowly critical; warming of ingredients and slow agitation are helpful. Avoidance of undue presence of water facilitates effective mixing and ensures good product performance.

The concentration of lecithin in the composition is such that a lubricating effective amount of lecithin is put down on the cookware by simple finger actuation of a conventional plunger in a pump bottle. Amounts of lecithin as low as 2.5 parts per 100 parts of the composition will be useful with higher amounts, up to 50 parts of the composition being likewise useful, and still higher amounts up to 65 parts may be used, particularly where extra heavy application of lecithin is desired, e.g. in roasting pans, but in most instances, concentrations of lecithin above 50 parts per 100 of the composition are not necessary for effective cookware lubrication. Since lecithin is not particularly sprayable, use of less than maximum amounts of lecithin in the composition is to be preferred, e.g. a range of 20 to 35 parts and most preferably, in the composition detailed below 25 parts, per 100 parts by weight of the composition.

As noted hereinbefore, water is desirably excluded and anhydrous ethanol preferably employed therefore, for the purpose of adjusting the consistency of the lecithin composition. Small quantities of ethanol are effective but larger amounts can be used so that depending on the specific dip tube and nozzle assembly as little as 2.5 parts up to as much as 25 parts ethanol (or isopropanol) may be used; preferred amounts are between 7.5 and 12.5 parts, all per 100 parts by weight of the composition.

Water, if present at all, should be limited to 2 percent by weight, based on the alcohol, but up to 5 percent water in ethanol (and 2.5 percent water in isopropanol), at a maximum may be used. In general these maximum water content levels may be expressed as those which do not reach, i.e. are below the amount of water forming a constant boiling mixture with the particular alcohol. The term, "essentially anhydrous" as used in the present specification and claims is intended to refer to the composition being free of water beyond, i.e. greater than the mentioned maximum limits just discussed.

The composition may further contain a vegetable oil, as is known in lecithin systems, for purposes of dilution. Useful vegetable oils are enumerated above; their concentrations as mentioned can be varied within a relatively broad range, e.g. 10 parts to 90 parts, and preferably 35 to 75 parts, per 100 parts of the total composition. About 65 parts of e.g. soy oil is preferred as the diluent in the case of 25 parts of lecithin being used.

Throughout the present specification and claims all parts and percentages are by weight, unless indicated otherwise.

EXAMPLE 1

A commercial lecithin, Alcolec-S preheated to 50° F. (25 parts) was mixed with soy oil at 50° F. (65 parts) in a room temperature vessel and stirred with room temperature absolute ethanol (200 proof) (10 parts). Water content was negligible. The resulting mixture was subjectively evaluated for ease of pump spraying and adequacy of spray deposit.

Evaluations for sprayability revealed that this system pumped easily into a finely dropleted cone which gave good surface coverage of even depth and uniform pattern.

This type of formulation further provides no visually perceptible separation of the mixture such as would be inimical to good produce performance after three freeze-thaw cycles of: −10° C. for 16 hours, 25° C. for 8 hours and so on; nor after 16 hours at 55° C. and 8 hours at 25° C., in a heat stability test.

It was further found that with smaller concentrations of ethanol, lower lecithin maximum concentrations are desirable, for sprayability; that at higher ethanol concentrations greater amounts of lecithin are desirable for stability and that for a given lecithin-vegetable oil system, ethanol facilitates composition sprayability, while maintaining good product stability in the invention formulations.

Use of lower amounts of ethanol is indicated when less than 200 proof alcohol is used, e.g. 190 proof ethanol is desirably not used in concentrations above about 15 parts, per 100 parts of the composition.

EXAMPLE 2

Isopropanol was substituted for ethanol in Example 1. No separation occurred. Other tests show isopropanol containing systems have a broader tolerance for compositional variations in lecithin content before loss of sprayability.

I claim:

1. A pump dispensable lecithin-based pan spray composition consisting essentially of 2.5 to 65 parts of lecithin and the balance an essentially anhydrous vehicle free of mineral oil, providing a pump sprayable consistency in the composition and consisting essentially of 2.5 to 25 parts of monohydric alcohol having 2 to 3 carbon atoms and 10 to 95 parts of edible vegetable oil, per 100 parts by weight of the composition.

2. Pump dispensable lecithin-based pan spray composition according to claim 1 in which said lecithin is present in an amount between 20 and 35 parts by weight.

3. Pump dispensable lecithin-based pan spray composition according to claim 1 in which said alcohol is present in an amount between 7.5 and 12.5 parts by weight.

4. Pump dispensable lecithin-based pan spray composition according to claim 3 in which said composition is free of water in amounts not below those forming a constant boiling mixture with said alcohol.

5. Pump dispensable lecithin-based pan spray composition according to claim 4 in which said alcohol is isopropyl alcohol.

6. Pump dispensable lecithin-based pan spray composition according to claim 4 in which said alcohol is ethanol.

7. Pump dispensable lecithin-based pan spray composition according to claim 6 in which said vegetable oil is present in an amount between 35 and 75 parts by weight.

8. Pump dispensable lecithin-based pan spray composition according to claim 7 in which said composition is free of water in amounts above 2% by weight of the weight of the ethanol present.

9. Pump dispensable lecithin-based pan spray composition according to claim 8 in which lecithin is present in an amount between 20 and 35 parts by weight.

10. Pump dispensable lecithin-based pan spray composition according to claim 9 in which said vegetable oil is a glyceryl ester of a fatty acid.

11. Pump dispensable lecithin-based pan spray composition according to claim 10 in which said vegetable oil comprises one or more of soybean oil, safflower oil, peanut oil, olive oil, corn oil, coconut oil, cottonseed oil, palm nut oil and apricot kernel oil.

* * * * *